(12) United States Patent
Norman

(10) Patent No.: US 7,055,123 B1
(45) Date of Patent: May 30, 2006

(54) HIGH-PERFORMANCE INTERCONNECT ARRANGEMENT FOR AN ARRAY OF DISCRETE FUNCTIONAL MODULES

(75) Inventor: Richard S. Norman, 1877 Poissant Road, Sutton, Quebec (CA) J0E 2K0

(73) Assignee: Richard S. Norman, Sutton (CA)

( * ) Notice: Subject to any disclaimer, the term of this patent is extended or adjusted under 35 U.S.C. 154(b) by 225 days.

(21) Appl. No.: 10/330,231

(22) Filed: Dec. 30, 2002

Related U.S. Application Data

(60) Provisional application No. 60/343,245, filed on Dec. 31, 2001.

(51) Int. Cl.
*G06F 17/50* (2006.01)

(52) U.S. Cl. .................... 716/12; 716/13; 716/15; 716/19

(58) Field of Classification Search ............ 716/12, 716/7–9, 13–15, 19
See application file for complete search history.

(56) References Cited

U.S. PATENT DOCUMENTS

| | | | |
|---|---|---|---|
| 4,603,974 A | | 8/1986 | Matsui |
| 4,955,020 A | | 9/1990 | Stone et al. |
| 5,514,884 A | | 5/1996 | Hively et al. |
| 5,572,213 A | * | 11/1996 | Noneman et al. ............. 342/13 |
| 5,613,158 A | | 3/1997 | Savage |
| 5,657,242 A | * | 8/1997 | Sekiyama et al. ............. 716/15 |
| 5,691,949 A | | 11/1997 | Hively et al. |
| 6,175,886 B1 | * | 1/2001 | Usami .......................... 710/100 |
| 6,195,593 B1 | * | 2/2001 | Nguyen ......................... 700/97 |
| 6,493,776 B1 | * | 12/2002 | Courtright et al. .......... 710/110 |
| 2002/0167910 A1 | * | 11/2002 | Gammenthaler ............ 370/252 |
| 2004/0114609 A1 | * | 6/2004 | Swarbrick et al. .......... 370/400 |

FOREIGN PATENT DOCUMENTS

| | | |
|---|---|---|
| JP | 01293616 A | 11/1989 |
| JP | 03046347 A | 2/1991 |
| JP | 04012550 A | 1/1992 |
| JP | 09115824 A | 5/1997 |
| JP | 11163531 A | 6/1999 |
| JP | 2000091424 A | 3/2000 |

\* cited by examiner

*Primary Examiner*—Vuthe Siek
*Assistant Examiner*—Magid Y. Dimyan
(74) *Attorney, Agent, or Firm*—Fetherstonhaugh - Smart & Biggar

(57) ABSTRACT

An interconnect arrangement for an array of N discrete functional modules, including a data bus between the modules formed of N sets of connections where each respective module sends on a respective one of the N sets. Each module is capable of receiving from each of the N sets, and contains an arbitration unit that selects a single set to receive at a given time if more than one of the sets has data for that module at that given time. The N sets are interwoven such that they can be formed by multiple imprints of a single reticle on a given lithographic layer, while maintaining relatively uniform connection lengths.

7 Claims, 3 Drawing Sheets

HIGH-PERFORMANCE INTERCONNECT ARRANGEMENT FOR AN ARRAY OF DISCRETE FUNCTIONAL MODULES

CROSS-REFERENCE TO RELATED APPLICATION

The above-referenced application is based on U.S. provisional patent application No. 60/343,245, filed on Dec. 31, 2001, having the same inventor.

FIELD OF THE INVENTION

The invention relates to the field of connectivity between discrete functional modules. More specifically, the invention is directed to a high-performance interconnect arrangement for an array of discrete functional modules, such as an array of cells on a silicon wafer or an array of chips on a printed circuit board (PCB).

BACKGROUND OF THE INVENTION

Microelectronic complexes, specifically systems and groups of discrete microelectronic functional modules, implement an important range of electronic devices, including microcomputers and microprocessors, and have important application in the design of electronic systems. Examples of such microelectronic complexes include Printed Circuit Boards (PCBs) containing a plurality of chips and/or integrated circuits, as well as Large-Area Integrated Circuits (LAICs), such as semi-conductor wafers, containing a plurality of microelectronic components. Essential to these microelectronic complexes are the data buses, which interconnect the discrete functional modules and allow the transfer of data from one connected module to any other.

In the case of a LAIC implemented on a semi-conductor wafer, the LAIC is typically divided into a plurality of discrete functional cells, each cell including at least one integrated circuit. These cells are laid out within a dedicated area on the wafer surface, and may form a grid-like array. Each cell has thousands, if not tens of thousands, of connections to other cells. The cells are formed on the wafer using patterned reticles, where, for each lithographic layer, a single reticle may be used repeatedly to form a common cell having multiple occurrences on the wafer.

Data buses are used to interconnect the various cells of the wafer, and are typically formed of one or more wire bundles, each bundle including a set of data and control wires. The wire bundles of a data bus are formed on the wafer body such that they are proximate and run parallel to the longitudinal axis of a row of cells. Reticles are also designed and used for forming the buses on the semiconductor material of the wafer.

In the case of a PCB, the PCB is similarly divided into a plurality of cells, where each cell is a discrete chip. In contrast with a LAIC, a PCB does not necessarily contain a plurality of identical sub-regions. However, data buses are used on PCBs, as on LAICs, to interconnect the various chips of the PCB.

Typically, the buses used on PCBs or LAICs have their wire bundles laid out in parallel. The highest performance interconnect for a row of cells is to have each cell in the row of cells transmit to a different wire bundle of the bus and to receive from every wire bundle of the bus. Each cell is connected to the different wire bundles of the bus by means of a set of connection lines, where the connection lines for a particular cell typically run perpendicular to the wire bundles of the bus.

A common problem associated with the existing high-performance interconnect arrangements used on PCBs and LAICs is that cells may experience difficulty in receiving data from a bus, or data transmitted from a bus to a cell may be lost, due to the increasing number of wire bundles per bus. More specifically, although each cell is connected to receive from every wire bundle of the bus, a typical cell can only receive data from one wire bundle at a time. Unfortunately, the greater the number of wire bundles from which a cell can receive data, the greater the odds that data may be sent simultaneously from different wire bundles to the cell.

Also, in order for each cell to transmit to a different wire bundle of the bus, each cell would normally require a different pattern of connection lines for connecting the transmitter and receivers of the cell to the different wire bundles of the bus. Accordingly, no two cells use the same pattern of connection lines, and a different reticle is required for each cell in order to form the different connection patterns. Obviously, both the cost and fabrication time associated with the wafer manufacturing process would increase with the number of different reticles required, while the efficiency of the process would decrease.

Existing solutions to render the wafer manufacturing process more efficient include the provision of a high-performance braided bus with interweaved wire bundles, where the bundles form a periodically repeating pattern. Within each period of the repeating pattern, the wire bundles of the bus are arranged according to a certain order, where this order changes from one period to the next such that each position within the order is occupied by a different wire bundle in each period. The repeating pattern allows the cells to share a common arrangement of connection lines for connecting to different conductive paths of the data bus, which reduces the number of different reticles required to manufacture the interconnect arrangement.

Unfortunately, the braided bus displays certain weaknesses, notably timing discrepancies in the signal transmission. From one period of the repeating pattern to the next, each wire bundle jumps from one position in the order to another position. However, while one wire bundle may jump one position, another may jump four positions. Accordingly, the different wire bundles of the bus define different path lengths between adjacent cells, such that timing differences arise for data transmission over different wire bundles. Further, even if a high-performance interconnect arrangement on a PCB or LAIC uses the braided bus, this does not solve the above-described difficulty experienced by cells in receiving data from several different wire bundles of a bus simultaneously. Against this background, it clearly appears that a need exists in the industry for an improved high-performance interconnect arrangement for an array of discrete functional modules.

SUMMARY OF THE INVENTION

According to a broad aspect, the invention provides an interconnect arrangement for an array of discrete functional modules, including a data bus, a set of connection lines and an arbitration unit. The data bus includes a set of N conductive paths for transferring signals between the discrete functional modules of the array. The set of connection lines is associated with one of the discrete functional modules and includes a plurality of receiving connection lines for receiving data from the data bus. Each receiving connection line in the set is connected to a different conductive path of the data bus. The arbitration unit is coupled to the set of connection lines such that, when data is received from the data bus over at least two different receiving connection lines concurrently, the arbitration unit is operative to select one of the at least two different receiving connection lines for connection to the respective discrete functional module.

This novel interconnect arrangement may be used within various different microelectronic complexes, including PCBs and LAICs, and implemented on substrates or bodies of different material types, including semiconductor material and dielectric material, in order to provide a high performance interconnection between an array of functional cells. Advantageously, the interconnect arrangement provides an arbitration mechanism for interfacing between the cells and the data bus. This arbitration mechanism ensures that, while each cell of the array may receive data from any one of the conductive paths of the data bus, a cell will only receive data from one conductive path of the data bus at a time.

For the purposes of the present application, a wafer is considered to be a thin slice of semi-conductor material, used as a base for an electronic component or circuit. A finished wafer includes at least one integrated circuit, and possibly thousands of integrated circuits, metallization having been performed on the wafer to interconnect the various components of the integrated circuit(s) (transistors, resistors, etc.).

Also for the purposes of the present application, a chip is considered to be a small piece of semi-conductor material that forms the base for an integrated circuit, enclosed in a package of material, such as ceramic, which is sealed under vacuum or in an inert atmosphere. A finished wafer may be diced into hundreds or thousands of chips, which are then packaged, each chip being rectangular in shape, typically between 1 and 20 mm on each edge.

In a specific example of implementation, a data bus on a semiconductor wafer includes N conductive paths for interconnecting a row of N cells, where each conductive path may contain one or more conductive wires or traces. The conductive paths of the data bus are interweaved to form a periodically repeating pattern. More specifically, the conductive paths are arranged such that they form a common pattern that repeats itself at regular intervals, thus dividing the data bus into a series of N periods. The common pattern corresponds to one period of the repeating pattern, and each period is associated with a particular one of the N cells.

Within each period of the repeating pattern formed by the conductive paths, the conductive paths are arranged side by side according to a specific order, which is characterized by N different positions. This specific order changes from one period to the next, such that the conductive paths are interweaved to form the repeating pattern. Over the N periods of the repeating pattern, each conductive path acquires each one of the N different positions of the specific order at least once.

In order to interweave the set of conductive paths, each conductive path defines a series of intermittent jumps, where these jumps correspond to changes in position within the specific order of the conductive paths. The different series of jumps defined by each conductive path of the data bus are computed on the basis of a predetermined algorithm, where many different algorithms are possible without departing from the scope of the present invention.

Each one of the N cells is provided with a set of connection lines, which connect the cell transmitters and receivers to the different conductive paths of the data bus. For each cell, the set of connection lines includes a single transmitting connection line and N receiving connection lines. The transmitting connection line is connected to the particular conductive path of the data bus to which the cell transmits, while each receiving connection line is connected to a different one of the N conductive paths of the data bus such that the cell may receive data from any one of the N conductive paths.

As a result of the interweaving of the N conductive paths, the cells share a common arrangement of connection lines, where the connection lines are arranged according to a predetermined order that is characterized by a plurality of different positions. Due to the interweaving of the conductive paths of the data bus, for two different cells the connection lines located at the same position in the arrangement of connection lines connect to different conductive paths of the data bus.

For each cell in the row of N cells, there is provided an arbitration unit operative to interface between the cell and the receiving connection lines of the corresponding set of connection lines. More specifically, this arbitration unit includes a receiver for each receiving connection line of the corresponding set, and is operative to monitor these receivers. When data arrives from the data bus over more than one of the receiving connection lines concurrently, the arbitration unit will select one of the receiving connection lines over which data is being received to connect to the cell. The selection of a particular receiving connection line by the arbitration unit may be based on priority levels associated with the different receiving connection lines of a set or, alternatively, may be determined by some predefined selection algorithm.

An arbitration unit may be implemented by a plurality of electronic components, where these electronic components are realized in the semiconductor material of the wafer using standard techniques.

According to another broad aspect, the invention provides a novel data bus. The data bus includes a set of N conductive paths, each conductive path of the set defining a series of intermittent jumps such that the N conductive paths are interweaved to form a periodically repeating pattern. Within each period of the pattern, the N conductive paths are arranged generally side by side according to a certain order, where this certain order is characterized by N different positions. From one period to the next, each conductive path occupies a different position within the certain order, the different position being within two positions of the previously occupied position. Each conductive path acquires each one of the N different positions of the certain order at least once over N periods of the repeating pattern.

BRIEF DESCRIPTION OF THE DRAWINGS

These and other features of the present invention will become apparent from the following detailed description considered in connection with the accompanying drawings, of which.

Figure 1:
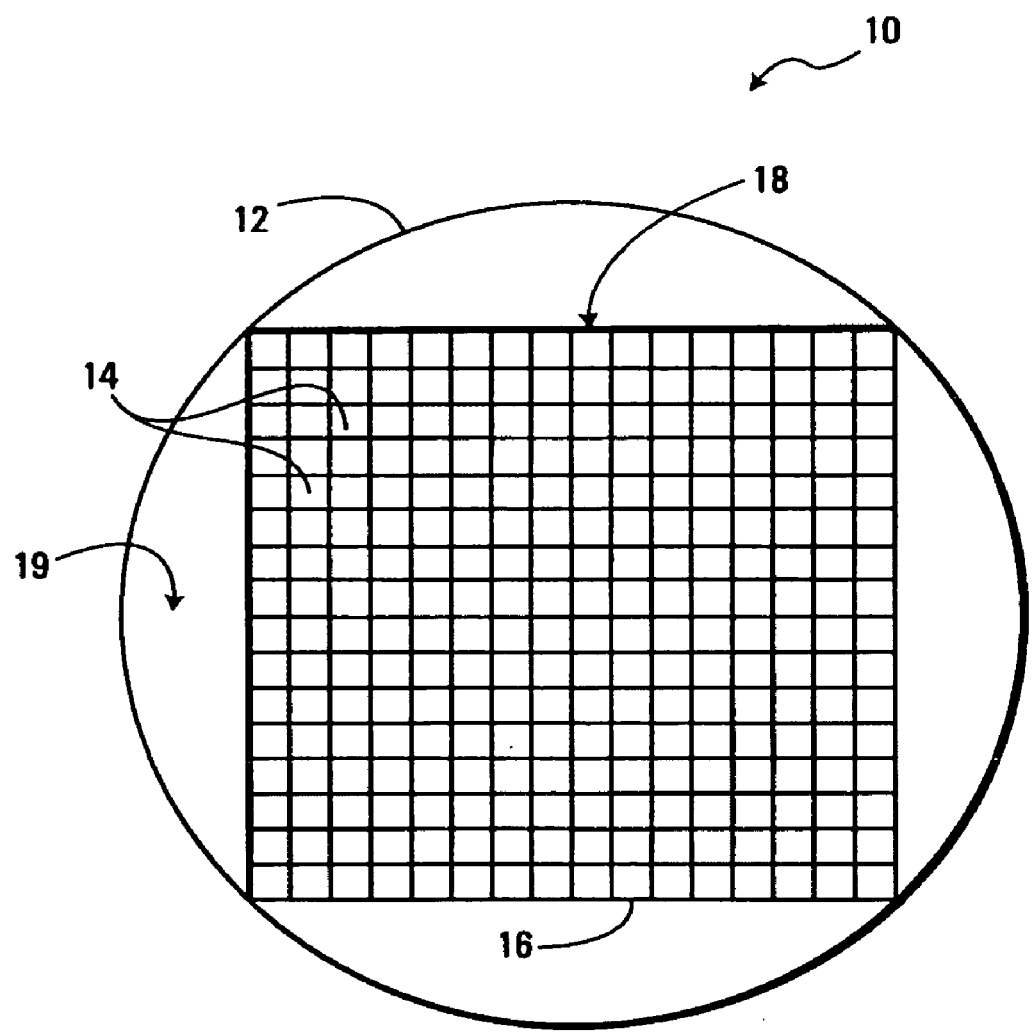
FIG. 1 is a top view of a semiconductor wafer.

In the drawings, embodiments of the invention are illustrated by way of example. It is to be expressly understood, however, that the drawings are provided only for purposes of illustration and as an aid to understanding, and are not intended to be a definition of the limits of the invention, for which reference should be made to the appending claims.

DETAILED DESCRIPTION

FIG. 1 is a top view of a semiconductor wafer 10, one example of a typical microelectronic complex. The wafer 10 is formed of a body of semiconductor material 12 and contains a plurality of discrete functional modules 14, also referred to as cells. In this particular example of a microelectronic complex, each discrete functional module 14 is embedded in the body 12 of wafer 10 and includes at least one integrated circuit.

Note that in other examples of microelectronic complexes, such as the printed circuit board (PCB), the discrete functional modules of the microelectronic complex may include attached chips and attached modules. Further, although the following example of implementation describes a microelectronic complex formed on a semiconductor wafer, the present invention is generally applicable to all microelectronic complexes formed on substrates, where these substrates may be of various types of materials.

The wafer body of semiconductor material 12 is made of any suitable material that has the requisite electrical properties and mechanical strength, such as silicon, germanium or gallium arsenide, and may be of any size or shape. In the example of FIG. 1, the semiconductor material of wafer body 12 is silicon, the body 12 characterized by a circular shape as a result of the cylindrical shape of the silicon crystal from which the wafer 10 was sliced. Typically, body 12 would be 10 to 30 cm in diameter and less than 1 mm thick.

The cells 14 of the wafer 10, whether they contain integrated circuits formed in the material of body 12 or chips mounted on the body 12, are dispersed within a dedicated area 16 of the body 12. Alternatively, the discrete functional modules 14 may be dispersed across the entire surface area of body 12. The methods and techniques used to form integrated circuits in the material of body 12, such as oxidation, diffusion, ion implantation and chemical vapor deposition, have been well documented and are well known in the art. As such, these methods and techniques will not be described in further detail.

In the example of FIG. 1, the cells 14 are shown laid out within the dedicated area 16 in a structured array 18, where the cells 14 are all adjacent one another and each cell 14 is of the same size and occupies substantially the same amount of space. Alternatively, the cells 14 could be spaced apart from each other within the array 18, and could be of different sizes and occupy different amounts of space.

The wafer 10 has first and second surfaces, the first surface 19 being shown in FIG. 1. Although not shown in FIG. 1, a plurality of Input/Output (I/O) signal conducting members are mounted on the first surface 19 for connection to an external substrate, such as a circuit board. Examples of signal conducting members include connectors, pins and wires, among other possibilities. These signal conducting members are characterized by a high level of conductivity for transmitting signals between the discrete functional modules 14 of the wafer 10 and the external substrate, where such signals may include electrical and/or optical signals.

In a specific example of implementation, the wafer 10 is constructed using flip-chip technology, and solder balls or bumps are formed on the surface 19 of wafer 10, for receiving the I/O signal conducting members. The concept of flip-chip technology is well-known to those skilled in the art, has been well documented and, as such, will not be described in further detail. Alternatively, the signal conducting members may be mounted to the second surface (not shown in FIG. 1) of the wafer 10.

The semiconductor wafer 10 contains interconnect arrangements for providing inter-cell connectivity and connectivity between the cells and the signal conducting members. Such interconnect arrangements include data buses that are operative to transfer signals between the cells of the wafer and between the cells and the signal conducting members, as well as sets of connection lines for transferring signals between the cells and the data buses. Examples of such signals include electric signals and optical signals.

The manufacturing process for semiconductor wafers such as wafer 10 typically involves the use of reticles. A reticle is a sheet of material on which a pattern is formed, for example a pattern of the wiring between two cells, for use in executing an exposure treatment of the semiconductor material, which is usually coated with a protective resist. During this exposure treatment, the pattern formed on the reticle is transcribed onto the wafer 10. Thus, during the manufacturing process of wafer 10, a different reticle is used to realize each layer of the inter-cell wiring, intra-cell wiring and data buses, among other possibilities.

The circuitry for the functional cells 14 of wafer 10 is formed in the lower lithographic layers of the wafer 10, while the data buses are formed in superimposing lithographic layers. Thus, the data buses sit on top of the cells 14 of the wafer 10. Typically, a majority of the components of the wafer interconnect arrangements are formed in the upper lithographic layers of a wafer, and thus sit atop the cell circuitry. However, certain components of the interconnect arrangements may also be realized in the lower lithographic layers, in which case the interconnect arrangement may span several different lithographic layers of the wafer 10.

A data bus is formed of a set of conductive paths, which carry signals conveying different types of information between the various components of the wafer 10. Examples of such different types of information include data, memory addresses and control data, among other possibilities. The data bus is shared amongst a plurality of cells 14 on the wafer 10, and each different conductive path of the data bus may interconnect different cells 14 of the plurality of cells 14.

In a specific example, each conductive path of the data bus is a bundle of wires, the wire bundle including both data and control wires for carrying electrical signals. Alternatively, each conductive path of the data bus may be a single wire. In yet another example, each conductive path of the data bus is an optical fiber, or a bundle of optical fibers, for carrying optical signals.

Advantageously, when a plurality of cells 14 share a data bus on wafer 10, each cell 14 of the plurality of cells 14 transmits signals to a different conductive path of the data bus but receives signals from all of the conductive paths of the data bus. Thus, each conductive path of the data bus receives signals from a specific one of the plurality of cells 14 which it interconnects, but may transfer these signals to any one or several of the plurality of cells 14, including the specific cell 14 from which it receives signals. Such a configuration increases the number of conductive paths required by the data bus, but reduces the associated level of complexity since there is no need for any inter-cell arbitration to send data over the data bus. For example, in order to interconnect N cells 14, the data bus requires a set of N conductive paths, such that each one of the N cells 14 can transmit to a different one of the N conductive paths. The configuration also decreases latency and increases throughput, since signal transmissions from many different cells 14 to the data bus can occur in parallel and thus simultaneously.

It is not deemed necessary to discuss in further detail the functionality of a data bus, nor the functional and/or structural details concerning access to the data bus by the cells 14 of the wafer 10, since both concepts are well known to those skilled in the art and neither are critical to the success of the present invention.

Specific to the present invention, for an array of cells 14 on the wafer 10 interconnected by a data bus, the interconnect arrangement also includes an arbitration mechanism for interfacing between the cells 14 and the data bus. This arbitration mechanism ensures that, while each cell may receive data from any one of the conductive paths of the data bus, a cell will only receive data from one conductive path of the data bus at a time, as will be described in further detail below.

Figure 2:
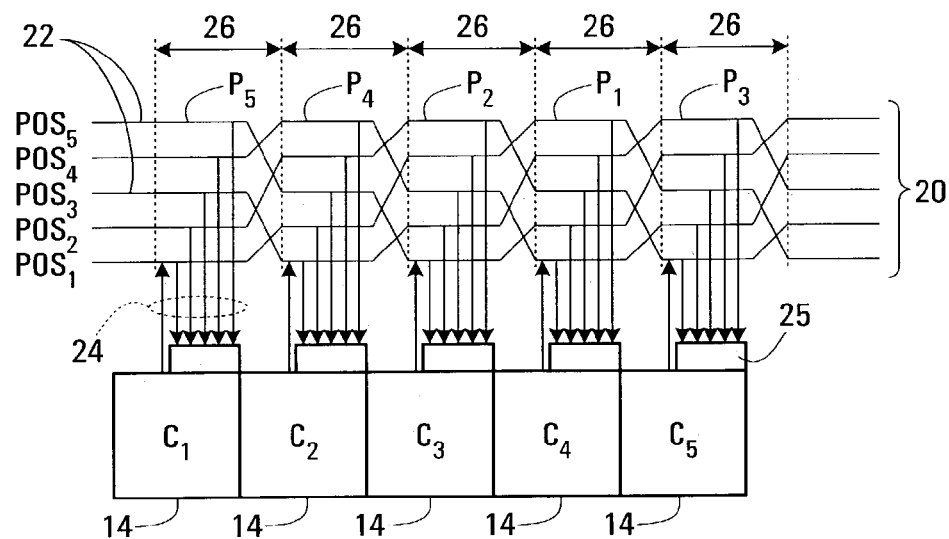
FIG. 2 illustrates a data bus interconnecting an array of cells on the wafer shown in FIG. 1, according to a non-limiting example of implementation of the present invention.

FIG. 2 illustrates a data bus 20 formed of a set of conductive paths 22, for interconnecting an array of cells 14 on wafer 10, according to a non-limiting example of implementation of the present invention. In the example shown in FIG. 2, the data bus 20 includes five conductive paths 22, notably paths $P_1$–$P_5$, for interconnecting a row of five cells 14, notably cells $C_1$–$C_5$. It is important to note that data bus 20 may include greater or fewer than five conductive paths 22, since the number of conductive paths 22 in the data bus 20 is based on the number of cells 14 to be interconnected by the data bus 20.

Figure 6:
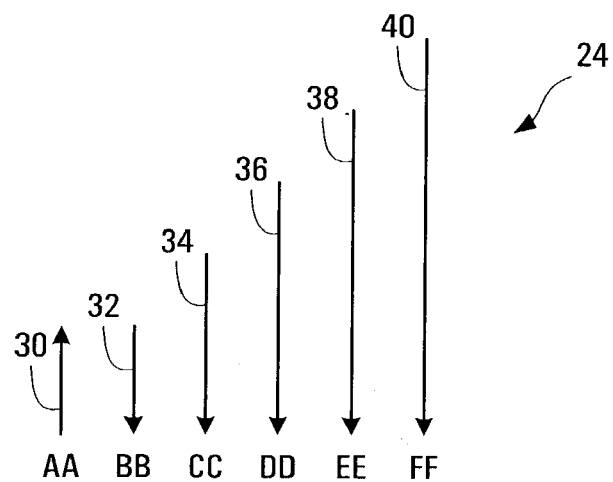
FIG. 6 illustrates an arrangement of connection lines for connecting the wafer cells to the data bus shown in FIG. 2.

Each one of cells $C_1$–$C_5$ is provided with a set 24 of connection lines, which connect the cell transmitters and receivers (not shown) to the different conductive paths $P_1$–$P_5$ of the data bus 20. In this specific example of implementation, the set 24 provides each cell $C_1$–$C_5$ with six connection lines, notably a transmitting connection line 30 and five receiving connection lines 32–40, as shown in FIG. 6. Note that the set 24 of connection lines 30–40 allows each cell $C_1$–$C_5$ to transmit to one of conductive paths $P_1$–$P_5$ and receive from all of conductive paths $P_1$–$P_5$.

Figure 3:
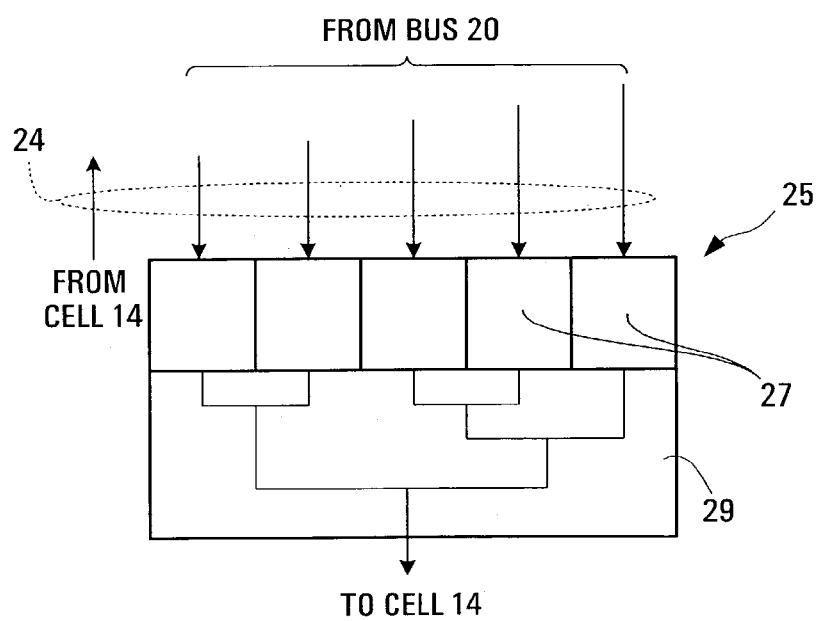
FIG. 3 is a functional illustration of an arbitration unit for the data bus shown in FIG. 2.

Associated with each set 24 of connection lines 24 is an arbitration unit 25, which interfaces between the data bus 20 and the corresponding cell 14, more specifically between the receiving connection lines 32–40 and the corresponding cell 14. As shown in FIG. 3, arbitration unit 25 includes a receiver 27 for each receiving connection line, where each receiver 27 is operative to receive data arriving over the associated receiving connection line from the data bus 20. Such receivers are well known to those skilled in the art, and will not be described in further detail.

The arbitration unit 25 is operative to monitor and to arbitrate between the receivers 27. As shown functionally at 29, when data arrives from the data bus 20 over more than one of the receiving connection lines concurrently, the arbitration unit 25 will select only one of these receiving connection lines over which data is being received to connect to the cell 14. The data arriving over the non-selected receiving connection lines may be discarded by the arbitration unit 25 or, alternatively, queued and forwarded onto the cell 14 in sequence.

In a specific example, each different receiving connection line of a set 24 is associated with a different priority level. Accordingly, when data arrives from data bus 20 over more than one receiving connection line concurrently, the arbitration unit 25 performs the selection of a particular receiving connection line based on the associated priority levels. Thus the arbitration unit 25 will select the receiving connection line characterized by the highest priority level. Alternatively, the arbitration unit 25 may implement one of various different predefined selection algorithms.

Each arbitration unit 25 is typically implemented by one or more integrated circuits, including a plurality of electronic components. These electronic components are realized in the semiconductor material of the wafer 10 using standard techniques, and thus are embedded in the wafer 10. Alternatively, the arbitration unit 25 may be implemented on a separate semiconductor chip, and mounted to the body 12 of wafer 10.

Figure 4:
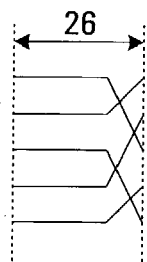
FIG. 4 illustrates the common pattern repeatedly formed by the interweaved conductive paths of the data bus shown in FIG. 2.

In the example of FIG. 2, the conductive paths $P_1$–$P_5$ of the data bus 20 are interweaved to form a periodically repeating pattern. Alternatively, the conductive paths 22 of the data bus 20 may be laid out in parallel, as in standard data buses. As seen in FIG. 2, the conductive paths $P_1$–$P_5$ are arranged such that they form a common pattern that repeats itself at regular intervals, thus dividing the data bus 20 into a series of periods 26. This common pattern is illustrated in FIG. 4, and corresponds to one period 26 of the repeating pattern.

Note that each period 26 of the data bus 20 is associated with a particular one of the cells $C_1$–$C_5$.

Advantageously, the data bus 20 shown in FIG. 2 may be formed on the wafer 10 using a single reticle. More specifically, an integral number of periods 26 of the repeating pattern, each period 26 corresponding to the common pattern shown in FIG. 4, are formed on a reticle, which is used during an exposure treatment to transcribe the common pattern onto the wafer 10. Thus, the reticle may be used repeatedly to realize the data bus 20 on the semiconductor body 12 of the wafer 10.

Within each period 26 of the repeating pattern formed by conductive paths $P_1$–$P_5$ shown in FIG. 2, the conductive paths $P_1$–$P_5$ of data bus 20 are arranged side by side according to a specific order. However, this specific order changes from one period 26 to the next, such that the conductive paths $P_1$–$P_5$ are interweaved to form the repeating pattern.

In the example of FIG. 2, the specific order of conductive paths $P_1$–$P_5$ is characterized by five different positions, $POS_1$ to $POS_5$. Within each period 26 of the repeating pattern, each conductive path $P_1$–$P_5$ acquires one of the five positions $POS_1$–$POS_5$ of the specific order. Further, each one of conductive paths $P_1$–$P_5$ acquires a different one of positions $POS_1$–$POS_5$ in each period 26 of the repeating pattern. Thus, over the five periods of the repeating pattern, each conductive path $P_1$–$P_5$ acquires each one of the five different positions of the specific order once.

In order to interweave the set of conductive paths $P_1$–$P_5$, each conductive path $P_1$–$P_5$ defines a series of intermittent jumps, where these jumps correspond to changes in position within the specific order of the conductive paths $P_1$–$P_5$. The different series of jumps defined by each conductive path $P_1$–$P_5$ of the data bus 20 are computed on the basis of a predetermined algorithm, where many different algorithms are possible without departing from the scope of the present invention.

In the particular example of implementation shown in FIG. 2, the interweaving of the set of conductive paths $P_1$–$P_5$ is based on following algorithm, in which the variable POS is used to represent the position of the conductive path within the specific order and N=5:
for $1 \leq POS \geq N$

```
for 1 ≤ POS ≥ N
{
   if(POS = N)
      POS = ((N + 1)/2)
   else
      if(POS = ((N + 1)/2))
         POS = 1
      else
         if(POS = (((N + 1)/2) - 1))
            POS = POS + 2
         else
            POS = POS + 1
}
```

Note that the above algorithm is applicable for a data bus 20 having an odd number of conductive paths, and thus of positions in the specific order (i.e. for N=3, 5, 7, 9, etc). In the case of an even number of conductive paths, and thus of positions in the specific order (i.e. for N=2, 4, 6, 8, etc), the algorithm is modified as follows:
for $1 \leq POS \geq N$

```
for 1 ≤ POS ≥ N
{
   if(POS = N)
      POS = (N/2)
   else
      if(POS = (N/2))
         POS = 1
      else
         if(POS = ((N/2) - 1))
            POS = POS + 2
         else
            POS = POS + 1
         }
```

On the basis of the above algorithm, the particular jump to be taken by each conductive path $P_1$–$P_5$, within each period 26, can be computed.

Figure 5:
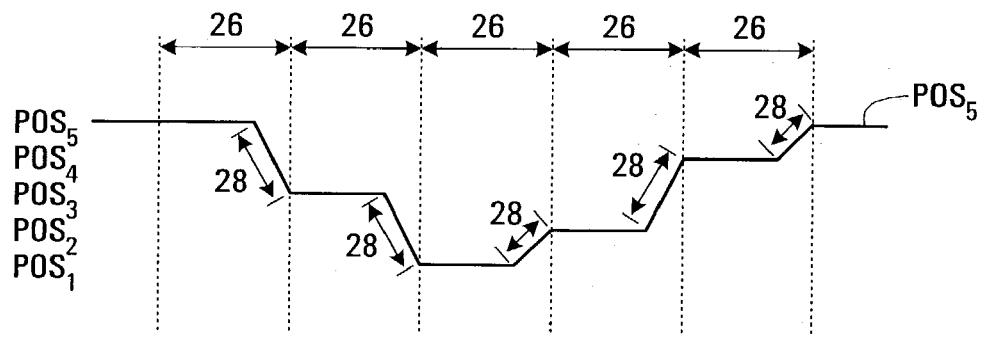
FIG. 5 illustrates a particular conductive path of the data bus shown in FIG. 2.

Taking for example the conductive path $P_5$, FIG. 5 illustrates the series of intermittent jumps 28 defined by conductive path $P_5$, which acquires POS=5 in the first period 26 of the repeating pattern. According to the above algorithm, since POS=5 for conductive path $P_5$ in the first period, the jump 28 defined by the conductive path $P_5$ in the first period is such that in the second period POS=(5+1)/2=3 for conductive path $P_5$. Since POS=3 in the second period, the jump 28 defined by the conductive path $P_5$ in the second period is such that in the third period POS=1. Applying the same algorithm for the remaining periods 28 of the repeating pattern, the conductive path $P_5$ defines a series of intermittent jumps 28, which allow the conductive path $P_5$ to acquire each one of the five positions of the specific order once over the five periods of the repeating pattern.

Advantageously, the repeating pattern formed by the above-described algorithm defines only jumps 28 of two or less positions for each conductive path of the bus. More specifically, from one period to the next, no conductive path will ever define a jump 28 of more than two positions in the specific order. Accordingly, the average difference in conductive path length between adjacent cells 14 is reduced, as are any resulting timing differences.

As a result of the interweaving of conductive paths $P_1$–$P_5$ in the data bus 20, the cells $C_1$–$C_5$ share a common arrangement of connection lines 24, shown in FIG. 6. The connection lines 30–40 are arranged according to a predetermined order that is characterized by a plurality of different positions AA–FF. At position AA is located transmitting connection line 30, which is operative to transmit signals from the cell to whichever one of conductive paths $P_1$–$P_5$ is located at $POS_1$ of the specific order of conductive paths $P_1$–$P_5$. At position BB is located receiving connection line 32, which is operative to receive signals from whichever one of conductive paths $P_1$–$P_5$ is located at $POS_1$ of the specific order of conductive paths $P_1$–$P_5$. Similarly, at positions CC–FF are located receiving connection lines 34–40, respectively, which are operative to receive signals from whichever one of conductive paths $P_1$–$P_5$ is located at $POS_2$–$POS_5$, respectively, of the specific order of conductive paths $P_1$–$P_5$.

Thus, since within each period 26 of the repeating pattern of data bus 20 a different one of conductive paths $P_1$–$P_5$ acquires $POS_1$ in the specific order of conductive paths $P_1$–$P_5$, for each one of cells $C_1$–$C_5$ the transmitting connection line 30 located at position AA connects to a different one of conductive paths $P_1$–$P_5$. With reference to FIG. 2, we see that for cell $C_1$, the transmitting connection line 30 of the corresponding set 24 of connection lines connects to conductive path $P_1$, while for cell $C_2$, the transmitting connection line 30, which is identically positioned within the arrangement 24 of connection lines, connects to conductive path $P_3$. Similarly, for cells $C_3$–$C_5$, the transmitting connection lines 30 connect to conductive paths $P_5$, $P_4$ and $P_2$, respectively.

Further, for each one of cells $C_1$–$C_5$, the receiving connection lines 32–40, although located at the same position within the arrangement 24 of connection lines, connect to different ones of conductive paths $P_1$–$P_5$.

Advantageously, a single arrangement of connection lines 24 is used for each one of cells $C_1$–$C_5$ in order to connect these cells $C_1$–$C_5$ to the data bus 20, all the while permitting each cell $C_1$–$C_5$ to transmit to a different conductive path $P_1$–$P_5$ Of the data bus 20. Thus, the arrangement of connection lines 24 for each one of cells $C_1$–$C_5$ may be formed on the wafer 10 using a single reticle. More specifically, the set of connection lines 24 shown in FIG. 6 is formed on a reticle, which is used during an exposure treatment to transcribe the connection lines onto the wafer 10. Thus, the reticle is used repeatedly to realize the same set of connection lines 24 for each cell $C_1$–$C_5$ on the semiconductor body 12 of the wafer 10.

In a variant example of implementation, for an array of cells 14 on the wafer 10 interconnected by a data bus, the interconnect arrangement also includes an amplification unit for amplifying the data transferred between the cells 14 and the data bus. This amplification unit includes a repeater, also referred to as an amplifier or a booster, for each cell 14 in the array. As in the case of the arbitration unit, the amplification unit is typically implemented by one or more electronic components, realized in the semiconductor material of the wafer 10 using standard techniques.

In another variant example of implementation, the arbitration unit described above is contained in a semiconductor chip (hereinafter "arbitrator chip"), and is mounted to a PCB, for interfacing between a data bus formed on the PCB and another chip or multi-chip module (MCM) attached to the PCB. The arbitrator chip is formed using flip-chip technology, and includes a plurality of solder bumps on the circuit board facing surface for engaging the conductive paths of the data bus on the PCB.

Note that in this example of implementation, the functionality of the solder bumps on the surface of the arbitrator chip is similar to the functionality of the receiving connection lines described above, in that they connect the data bus and the arbitration unit.

The arbitrator chip also includes a plurality of signal conducting members, such as pins, for engaging and connecting to the other chip or MCM attached to the PCB. Thus, the arbitrator chip can interface between the data bus and the attached chip or MCM, in order arbitrate between the conductive paths of the data bus similarly to that described above with regard to the semiconductor wafer.

Although several embodiments have been illustrated, this was for the purpose of describing, but not limiting, the invention. Various modifications will become apparent to those skilled in the art and are within the scope of this invention, which is defined more particularly by the attached claims.

The invention claimed is:

1. An interconnect arrangement, for an array of N discrete functional modules, said interconnect arrangement comprising:
   a) a data bus including a set of N conductive paths for transferring signals between the discrete functional modules of the array, wherein the N conductive paths of said data bus are interweaved to form a periodically repeating pattern, wherein within each period of said repeating pattern the N conductive paths are arranged generally side by side according to a certain order, said certain order changing from one period to the next;
   b) a set of connection lines, said set of connection lines being associated with one of the discrete functional modules and including a plurality of receiving connection lines for receiving data from said data bus, each receiving connection line of said set being connected to a different conductive path of said data bus; and
   c) an arbitration unit coupled to said set of connection lines, whereby when data from said data bus is received over at least two different receiving connection lines of said set of connection lines concurrently, said arbitration unit is operative to select one of the at least two different receiving connection lines for connection to the respective discrete functional module.

2. The interconnect arrangement as defined in claim 1, wherein said interconnect arrangement includes N sets of connection lines and N arbitration units, each set of connection lines being associated with a respective one of the N discrete functional modules, each arbitration unit being coupled to a respective one of said N sets of connection lines.

3. The interconnect arrangement as defined in claim 2, wherein each of said arbitration units includes a receiver.

4. The interconnect arrangement as defined in claim 1, wherein each receiving connection line of a set of connection lines is associated with a priority level, said arbitration unit operative to select one of the at least two different receiving connection lines on the basis of the associated priority levels.

5. The interconnect arrangement as defined in claim 1, wherein said certain order is characterized by N different positions, and from one period to the next each conductive path of said data bus occupies a different position within said certain order, the different position being within two positions of the previously occupied position.

6. A large-area integrated circuit including the interconnect arrangement as described in claim 1, wherein said interconnect arrangement comprises more than one reticle image on at least one lithographic layer.

7. A semiconductor wafer including the interconnect arrangement as described in claim 1, wherein said interconnect arrangement comprises more than one reticle image on at least one lithographic layer.

* * * * *